US012675167B2

(12) United States Patent　　(10) Patent No.: US 12,675,167 B2
Kolych et al.　　(45) Date of Patent: Jul. 7, 2026

(54) PAIRING DEVICES USING GESTURES

(71) Applicant: Cypress Semiconductor Corporation, San Jose, CA (US)

(72) Inventors: Igor Kolych, Lviv (UA); Kiran Uln, Pleasanton, CA (US); Claudio Rey, Chandler, AZ (US)

(73) Assignee: Infineon Technologies Americas Corp., El Segundo, CA (US)

( * ) Notice: Subject to any disclaimer, the term of this patent is extended or adjusted under 35 U.S.C. 154(b) by 476 days.

(21) Appl. No.: 18/086,097

(22) Filed: Dec. 21, 2022

(65) Prior Publication Data

US 2024/0211050 A1　　Jun. 27, 2024

(51) Int. Cl.
*G06F 3/01*　　(2006.01)
*H04W 4/80*　　(2018.01)
*H04W 76/14*　　(2018.01)

(52) U.S. Cl.
CPC .............. *G06F 3/017* (2013.01); *H04W 4/80* (2018.02); *H04W 76/14* (2018.02)

(58) Field of Classification Search
CPC .......... G06F 3/017; H04W 4/80; H04W 76/14
See application file for complete search history.

(56) References Cited

U.S. PATENT DOCUMENTS

| | | | |
|---|---|---|---|
| 2013/0050458 A1* | 2/2013 | Kim ....................... | G06V 40/10 348/77 |
| 2014/0006954 A1* | 1/2014 | Raffa ..................... | G06V 40/20 715/733 |
| 2014/0267024 A1* | 9/2014 | Keller .................... | G06F 3/014 345/156 |
| 2015/0096375 A1* | 4/2015 | Krishnakumar ........ | G01S 17/86 250/221 |
| 2015/0220110 A1* | 8/2015 | Brawer ................. | G06F 3/1454 361/679.26 |
| 2017/0094706 A1* | 3/2017 | Kim ....................... | H04W 48/20 |
| 2018/0157331 A1* | 6/2018 | Raffa .................... | G06F 3/0304 |
| 2020/0045751 A1* | 2/2020 | Sassenrath ............ | H04W 76/14 |
| 2021/0311893 A1* | 10/2021 | Pohl ........................ | H04B 7/26 |
| 2022/0046310 A1* | 2/2022 | Shin ........................ | G06F 3/038 |
| 2024/0061513 A1* | 2/2024 | Reisman ............... | G06F 3/0485 |

FOREIGN PATENT DOCUMENTS

| | | | | | |
|---|---|---|---|---|---|
| CN | 114268935 A | * | 4/2022 | | |
| WO | WO-2020252483 A1 | * | 12/2020 | ............. | A24F 40/65 |

* cited by examiner

*Primary Examiner* — Austin J Moreau

(57) ABSTRACT

A provisioning device includes a user interface, a radio transceiver to communicate with a pairable device, and a controller. The controller is configured to initiate a pairing protocol, via the radio transceiver, with the pairable device. The controller is configured to instruct a user, via the user interface, to perform a gesture with the provisioning device or the pairable device. The controller is configured to pair the provisioning device with the pairable device, via the radio transceiver, in response to the performed gesture matching an expected gesture within a threshold level of similarity.

18 Claims, 13 Drawing Sheets

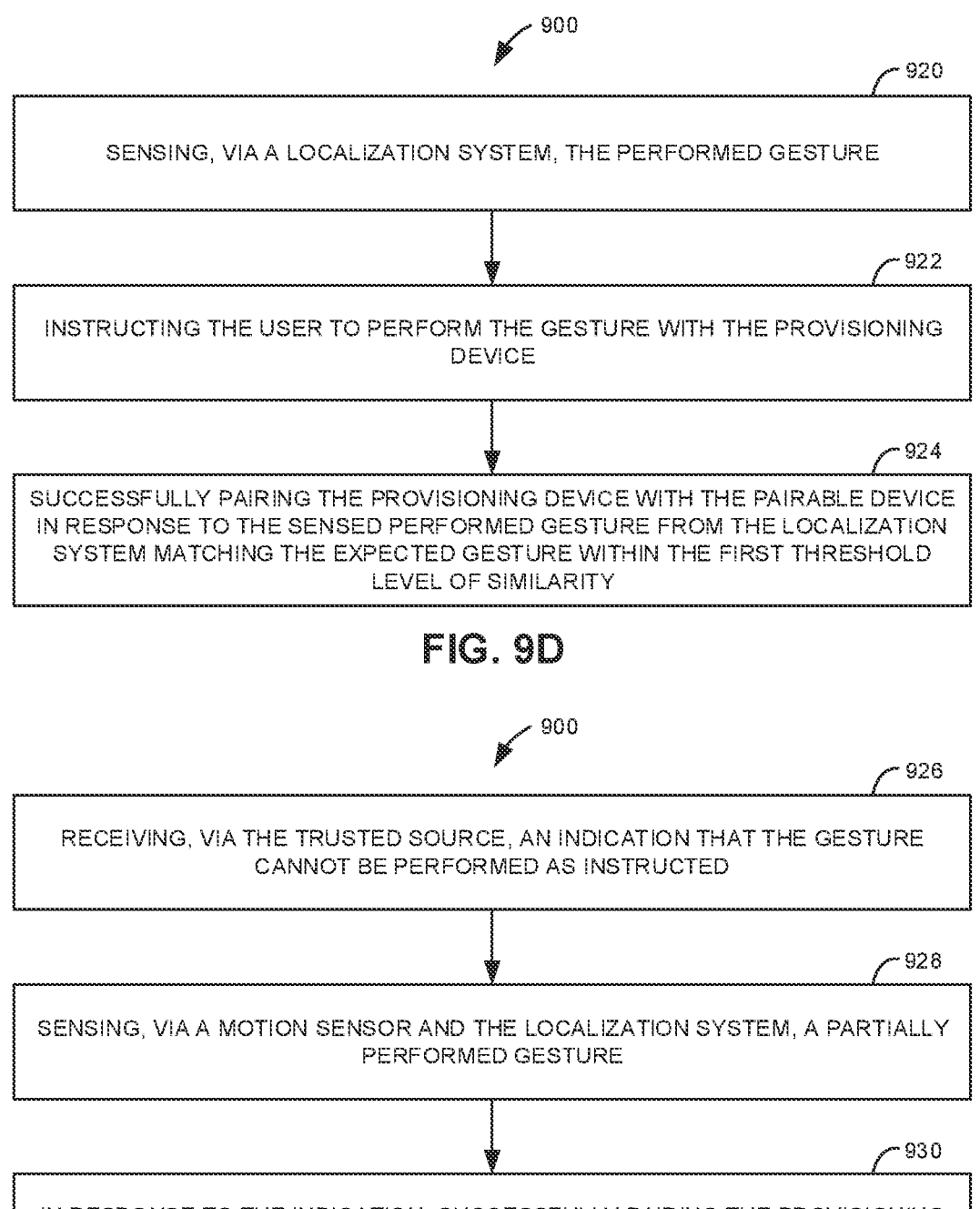

900

920

SENSING, VIA A LOCALIZATION SYSTEM, THE PERFORMED GESTURE

922

INSTRUCTING THE USER TO PERFORM THE GESTURE WITH THE PROVISIONING DEVICE

924

SUCCESSFULLY PAIRING THE PROVISIONING DEVICE WITH THE PAIRABLE DEVICE IN RESPONSE TO THE SENSED PERFORMED GESTURE FROM THE LOCALIZATION SYSTEM MATCHING THE EXPECTED GESTURE WITHIN THE FIRST THRESHOLD LEVEL OF SIMILARITY

RECEIVING, VIA THE TRUSTED SOURCE, AN INDICATION THAT THE GESTURE CANNOT BE PERFORMED AS INSTRUCTED

928

SENSING, VIA A MOTION SENSOR AND THE LOCALIZATION SYSTEM, A PARTIALLY PERFORMED GESTURE

930

IN RESPONSE TO THE INDICATION, SUCCESSFULLY PAIRING THE PROVISIONING DEVICE WITH THE PAIRABLE DEVICE IN RESPONSE TO THE SENSED PARTIALLY PERFORMED GESTURE FROM THE LOCALIZATION SYSTEM MATCHING THE SENSED PARTIALLY PERFORMED GESTURE FROM THE MOTION SENSOR WITHIN THE FIRST THRESHOLD LEVEL OF SIMILARITY AND THE SENSED PARTIALLY PERFORMED GESTURE FROM THE LOCALIZATION SYSTEM OR THE MOTION SENSOR MATCHING THE EXPECTED GESTURE WITHIN A SECOND THRESHOLD LEVEL OF SIMILARITY LOWER THAN THE FIRST THRESHOLD LEVEL OF SIMILARITY

FIG. 9E

PAIRING DEVICES USING GESTURES

BACKGROUND

Bluetooth is a short-range wireless technology standard that is used for exchanging data between fixed and mobile devices over short distances and building personal area networks (PANs). Bluetooth (BT) and Bluetooth Low Energy (BLE) provisioning (i.e., pairing) procedures typically are an unsecure process or rely on a visual verification (e.g., codes comparison). If the Bluetooth device to be provisioned does not include a display, the provisioning (pairing) procedure may be implemented via only a button press. Unsecured provisioning procedures may result in incorrect devices being provisioned (e.g., a neighbor's light bulb could be incorrectly provisioned into a BLE mesh network).

For these and other reasons, a need exists for the present invention.

SUMMARY

Some examples of the present disclosure relate to a provisioning device. The provisioning device includes a user interface, a radio transceiver to communicate with a pairable device, and a controller. The controller is configured to initiate a pairing protocol, via the radio transceiver, with the pairable device. The controller is configured to instruct a user, via the user interface, to perform a gesture with the provisioning device or the pairable device. The controller is configured to pair the provisioning device with the pairable device, via the radio transceiver, in response to the performed gesture matching an expected gesture within a threshold level of similarity.

Other examples of the present disclosure relate to a system. The system includes a provisioning device, a trusted source, a user interface, and a localization system. The provisioning device is to pair with a pairable device over a wireless communication channel for secure communications. The trusted source is to determine a gesture to be performed with the provisioning device or the pairable device and to compare a sensed performed gesture to an expected gesture to pair the provisioning device with the pairable device. The user interface is to instruct the user of the gesture to be performed. The localization system is to sense the performed gesture. The provisioning device is to pair with the pairable device in response to the sensed performed gesture from the localization system matching the expected gesture within a first threshold level of similarity.

Yet other examples of the present disclosure relate to a method for secure pairing of devices. The method includes initiating a pairing protocol between a provisioning device and a pairable device. The method includes determining, via the provisioning device and the pairable device, a location of the provisioning device relative to the pairable device. The method includes instructing a user, via a trusted source, to perform a gesture with the provisioning device or the pairable device based on the determined location. The method includes sensing, via the provisioning device, the performed gesture. The method includes comparing, via the trusted source, the sensed performed gesture to an expected gesture. The method includes successfully pairing the provisioning device with the pairable device in response to the sensed performed gesture matching the expected gesture within a first threshold level of similarity.

BRIEF DESCRIPTION OF THE DRAWINGS

FIGS. 9A-9E are flow diagrams illustrating another example of a method for pairing a provisioning device with a pairable device.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1A:
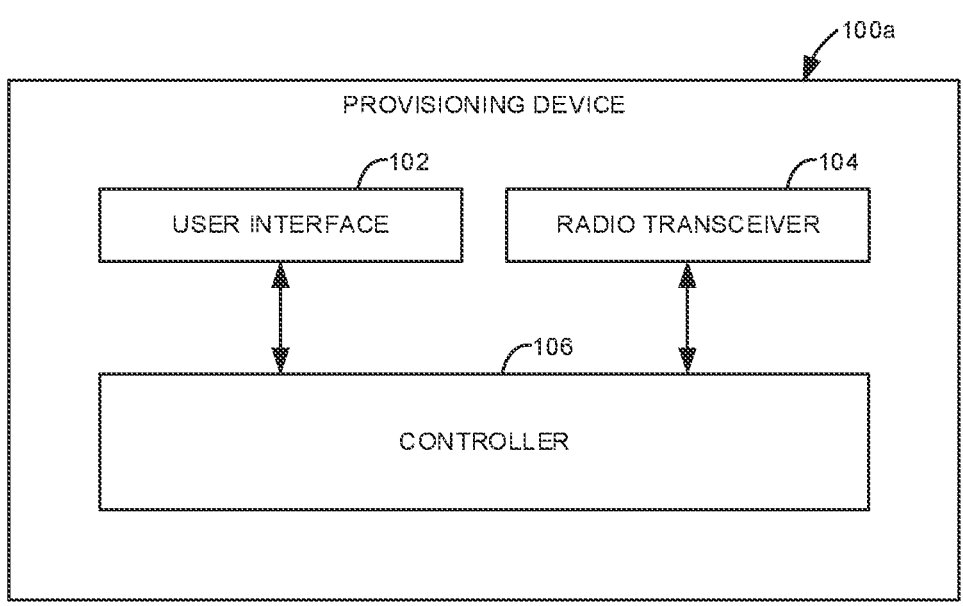
FIGS. 1A and 1B are block diagrams illustrating examples of provisioning devices.

FIG. 1A is a block diagram illustrating an example provisioning device 100a. Provisioning device 100a includes a user interface 102, a radio transceiver 104 to communicate with a pairable device (which is described below with reference to FIG. 2), and a controller 106. Controller 106 is communicatively coupled to user interface 102 and radio transceiver 104. Provisioning device 100a is configured to be paired with a pairable device over a wireless communication channel for secure communications. Provisioning device 100a may include a smartphone, a tablet, a desktop or laptop computer, a smart home hub, a vehicle, an entertainment device or system (e.g., television, receiver, game console, set top box, streaming device, etc.), or another suitable device capable of wireless communications with a pairable device. As described in more detail below with reference to the following figures, provisioning device 100a may be paired with a pairable device by instructing a user to perform a gesture with the provisioning device or the pairable device, and in response to the performed gesture matching an expected gesture within a threshold level of similarity, pairing provisioning device 100a with the pairable device.

Controller 106 may be a Central Processing Unit (CPU), microprocessor, microcontroller, Application Specific Integrated Circuit (ASIC), or other suitable logic circuitry for controlling the operation of provisioning device 100a including user interface 102 and radio transceiver 104. In some examples, controller 106 may include a machine-readable storage medium (e.g., read-only memory, non-volatile memory) storing instructions (e.g., firmware and/or software) to be executed by controller 106 for controlling the operation of provisioning device 100*a*.

User interface 102 may include a graphical user interface (e.g., display, touchscreen), a speaker, an input device(s) (e.g., touchscreen, keyboard, buttons, etc.) for interacting with provisioning device 100*a*. User interface 102 may inform a user of a gesture to be performed for pairing provisioning device 100*a* with a pairable device. In addition, user interface 102 may display a performed gesture and an expected gesture for the user to visually verify the performed gesture. Radio transceiver 104 may include a Bluetooth (BT) transceiver, a Bluetooth Low Energy (BLE) transceiver, a Wi-Fi transceiver, an Ultra-wideband (UWB) transceiver, or another suitable transceiver capable of communicating wirelessly with a pairable device. With provisioning device 100*a* paired with a pairable device, radio transceiver 104 may be used for secure communications between provisioning device 100*a* and the pairable device. The operation of provisioning device 100*a* will be further described below with reference to FIGS. 8A-8E.

Figure 1B:
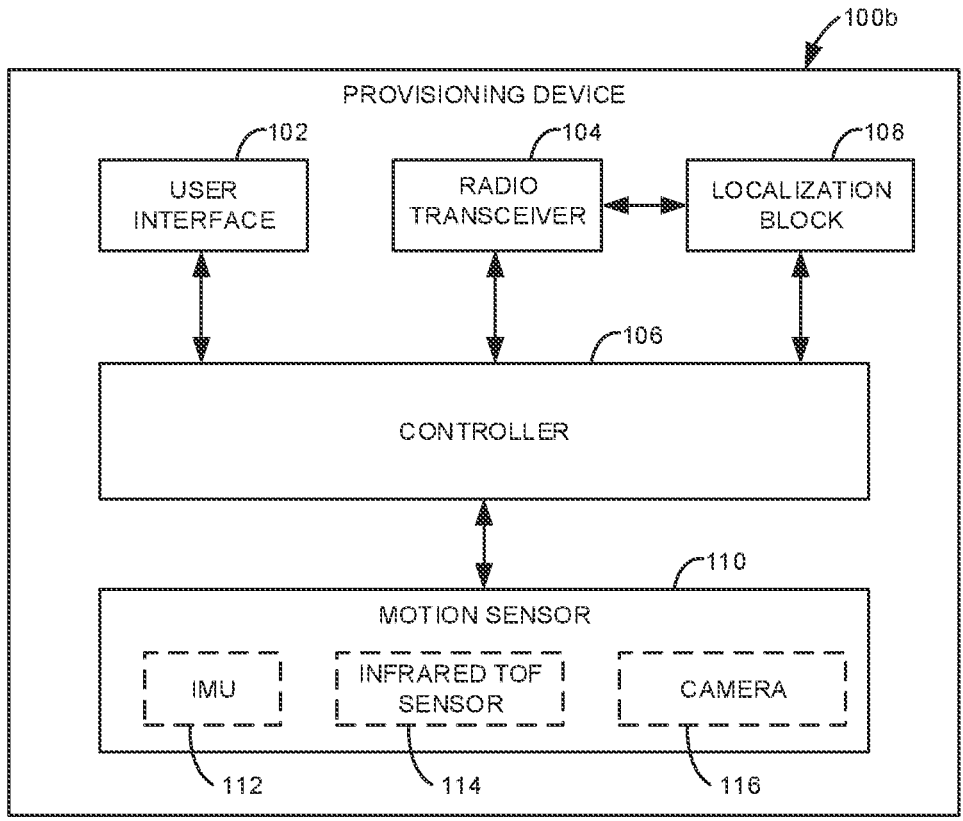

FIG. 1B is a block diagram illustrating an example provisioning device 100*b*. In addition to a user interface 102, a radio transceiver 104 to communicate with a pairable device, and a controller 106 as previously described and illustrated with reference to FIG. 1A, provisioning device 100*b* also includes a localization block 108 and a motion sensor 110. Localization block 108 is communicatively coupled to radio transceiver 104 and controller 106. Motion sensor 110 is communicatively coupled to controller 106.

A localization system, of the provisioning device 100*b*, including radio transceiver 104, controller 106, and localization block 108 is configured to sense gestures (via radio transceiver 104) performed by a user with provisioning device 100*b* or a pairable device. Localization block 108 may estimate distance change, velocity, angle, and/or angular velocity with respect to a pairable device. The localization system may sense distance change, velocity, angle, and/or angular velocity by transmitting Radio Frequency (RF) signals (e.g., via radio transceiver 104), which are received and reflected (e.g., transmitted) by a pairable device back to localization block 108 (e.g., via radio transceiver 104) and analyzed.

Motion sensor 110 may include an Inertial Measurement Unit (IMU) 112, an infrared Time of Flight (ToF) sensor 114, a camera 116, and/or another suitable motion sensor. In some examples, the localization system may include motion sensor 110, such that the localization system may include IMU 112, infrared ToF sensor 114, and/or camera 116. IMU 112 may measure and report to controller 106 a force, an angular rate, and/or an orientation of provisioning device 100*b*. IMU 112 may include any suitable combination of accelerometers and/or gyroscopes. Infrared ToF sensor 114 may measure the time taken by provisioning device 100*b* to travel a distance. Camera 116 may be used to measure (e.g., via video and/or photo processing techniques) distance, movement, etc. Motion sensor 110 may sense gestures performed by a user with provisioning device 100*b*.

In some examples, provisioning device 100*b* is paired with a pairable device in response to a performed gesture sensed by the localization system matching an expected gesture within a first threshold level of similarity (e.g., having a similarity within a range between about 85 percent and about 100 percent). In other examples, provisioning device 100*b* is paired with a pairable device in response to a performed gesture sensed by the localization system matching the performed gesture sensed by motion sensor 110 within the first threshold level of similarity. In another example, provisioning device 100*b* is paired with a pairable device in response to a performed gesture sensed by the localization system or motion sensor 110 matching an expected gesture within a second threshold level of similarity (e.g., having a similarity within a range between about 70 percent and about 85 percent) lower than the first threshold level of similarity in response to the user indicating the gesture cannot be performed as instructed. For example, if a piece of furniture is preventing the user from performing the complete gesture as instructed, the user may indicate the portion of the gesture that cannot be performed (e.g., via user interface 102) and perform the remaining portions of the gesture that can be performed. The partially performed gesture that is sensed would not match the expected gesture within the first threshold level of similarity, but may match the expected gesture within the second threshold level of similarity. The first threshold level and/or the second threshold level of similarity may be selected based on the desired security level of the pairing of provisioning device 100*b* with the pairable device.

Figure 2:
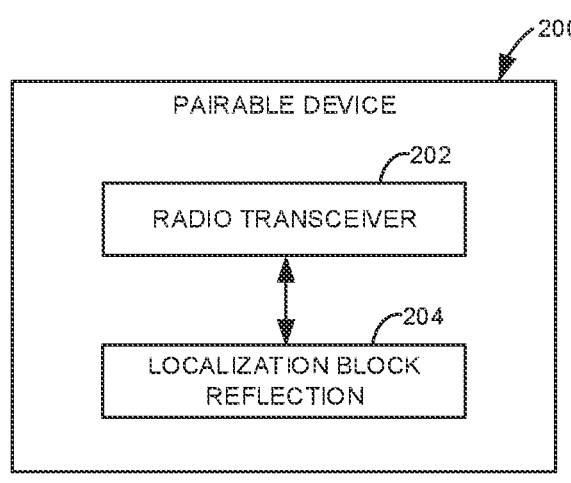
FIG. 2 is a block diagram illustrating one example of a pairable device.

FIG. 2 is a block diagram illustrating one example of a pairable device 200. Pairable device 200 includes a radio transceiver 202 and a localization block reflection component 204. Pairable device 200 may include a smart home device (e.g., light bulb, switch, thermostat, lock, sensor, camera, appliance, etc.), a headset, a speaker, a microphone, a remote control, a game controller, a key fob, or another suitable device capable of wireless communications with a provisioning device.

Radio transceiver 104 may include a BT transceiver, a BLE transceiver, a Wi-Fi transceiver, an UWB transceiver, or another suitable transceiver capable of communicating wirelessly with a provisioning device, such as provisioning device 100*a* or 100*b* of FIGS. 1A and 1B, respectively. Localization block reflection component 204 is communicatively coupled to radio transceiver 202. Localization block reflection component 204 may reflect radio signals (e.g., via radio transceiver 202) back to a provisioning device so that the provisioning device may sense distance change, velocity, angle, and/or angular velocity of pairable device 200 relative to the provisioning device.

Figure 3:
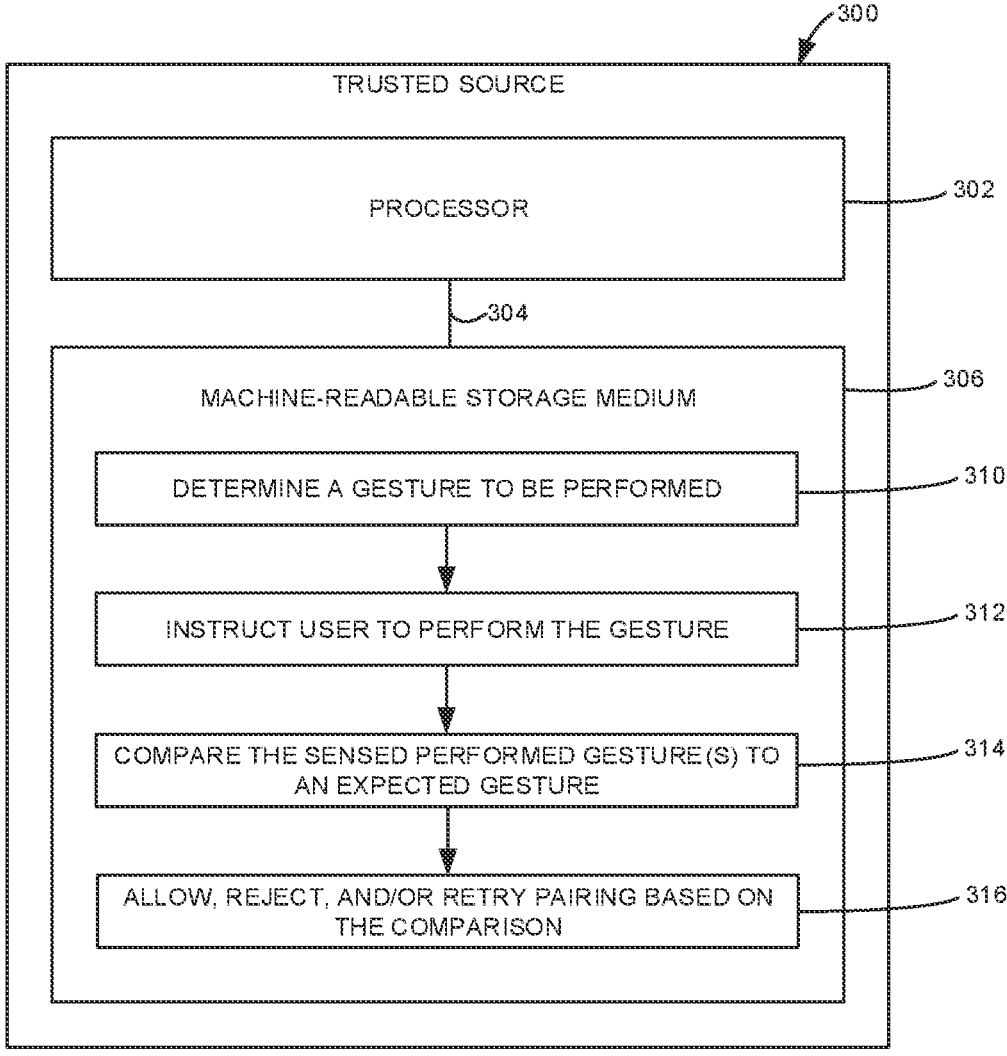
FIG. 3 is a block diagram illustrating one example of a trusted source.

FIG. 3 is a block diagram illustrating one example of a trusted source 300. As will be described in more detail below with reference to FIGS. 4A-4D, trusted source 300 may be part of a provisioning device (e.g., 100*a* of FIG. 1A or 100*b* of FIG. 1B) or separate from a provisioning device. Trusted source 300 is configured to facilitate pairing of a provisioning device with a pairable device. Trusted source 300 may determine a gesture to be performed with a provisioning device or a pairable device and compare a sensed performed gesture to an expected gesture to pair a provisioning device with a pairable device. In some examples, trusted source 300 may include a user interface to instruct a user of a gesture to be performed.

Trusted source 300 includes a processing system including a processor 302 and a machine-readable storage medium 306. Processor 302 is communicatively coupled to machine-readable storage medium 306 through a communication path 304. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 includes one (i.e., a single) central processing unit (CPU) or microprocessor or more than one (i.e., multiple) CPU or microprocessor, and/or other suitable hardware devices for retrieval and execution of instructions stored in machine-readable storage medium 306. Processor 302 may fetch, decode, and execute instructions 310-316 to facilitate pairing of a pairable device (e.g., 200 of FIG. 2) with a provisioning device (e.g., 100*a* of FIG. 1A or 100*b* of FIG. 1B).

Processor 302 may fetch, decode, and execute instructions 310 to determine a gesture to be performed. The gesture to be performed may be based on the initial location (e.g., distance, angle of arrival, etc.) of the provisioning device (e.g., as reported by the localization system and/or motion sensor 110 of FIG. 1B); the desired security level for the pairing of the provisioning device with the pairable device: and/or a preprogrammed gesture specified by the provisioning device, the pairable device, or the trusted source.

Processor 302 may fetch, decode, and execute instructions 312 to instruct a user to perform the gesture. The user may be instructed to perform the gesture with the provisioning device or the pairable device. The user may be instructed to perform the gesture by displaying the gesture to be performed on a display of a user interface (e.g., 102 of FIG. 1A or 1B), by audibly instructing the user of the gesture to be performed via a speaker of a user interface, and/or by referencing another source (e.g., instruction manual, website, sticker on pairable device, etc.) where the gesture to be performed is illustrated and/or described.

Processor 302 may fetch, decode, and execute instructions 314 to compare the sensed performed gesture(s) to an expected gesture. The gesture performed by the user with the provisioning device or the pairable device may be sensed by a localization system (e.g., including 108 of FIG. 1B and 204 of FIG. 2) and/or by a motion sensor (e.g., 110 of FIG. 1B). The user performed gesture sensed by the localization system may be compared to the expected gesture, the user performed gesture sensed by the motion sensor may be compared to the expected gesture, and/or the user performed gesture sensed by the localization system may be compared to the user performed gesture sensed by the motion sensor.

Processor 302 may fetch, decode, and execute instructions 316 to allow, reject, and/or retry pairing based on the comparison. For example, if the user performed gesture sensed by the localization system and/or the motion sensor matches the expected gesture within a threshold level of similarity, the provisioning device is successfully paired with the pairable device. If the user performed gesture sensed by the localization system and/or the motion sensor does not match the expected gesture within the threshold level of similarity, the provisioning device is not paired with the pairable device and the pairing may be retried.

As an alternative or in addition to retrieving and executing instructions, processor 302 may include one (i.e., a single) electronic circuit or more than one (i.e., multiple) electronic circuit comprising a number of electronic components for performing the functionality of one of the instructions or more than one of the instructions in machine-readable storage medium 306. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 306 is a non-transitory storage medium and may be any suitable electronic, magnetic, optical, or other physical storage device that stores executable instructions. Thus, machine-readable storage medium 306 may be, for example, a random access memory (RAM), an electrically-erasable programmable read-only memory (EEPROM), a storage drive, an optical disc, and the like. Machine-readable storage medium 306 may be disposed within trusted source 300, as illustrated in FIG. 3. In this case, the executable instructions may be installed on trusted source 300. Alternatively, machine-readable storage medium 306 may be a portable, external, or remote storage medium that allows trusted source 300 to download the instructions from the portable/external/remote storage medium. In this case, the executable instructions may be part of an installation package.

Figures 4A, 4B, 4C, 4D:
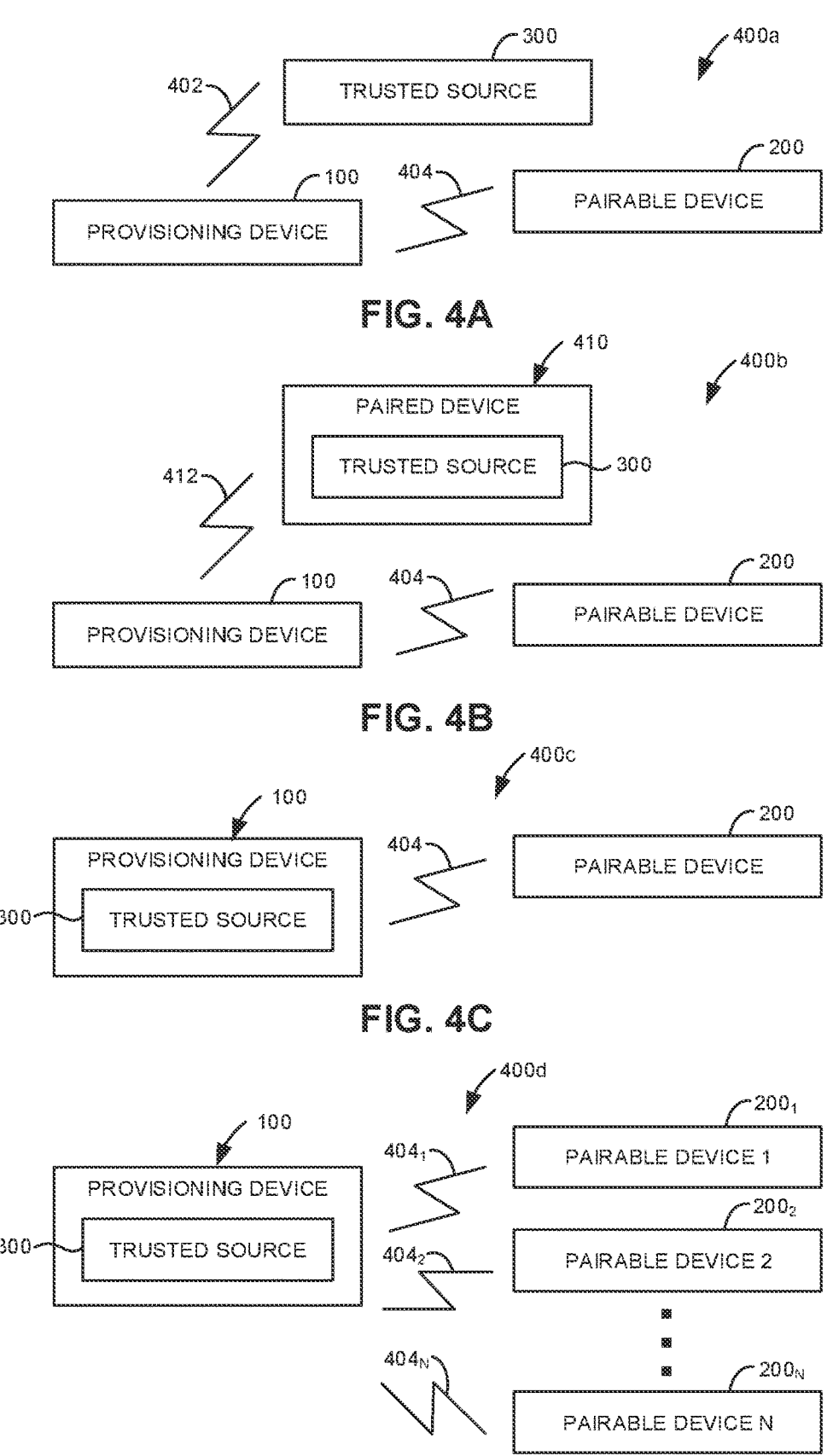
FIGS. 4A-4D are block diagrams illustrating example systems for pairing provisioning devices with pairable devices.

FIG. 4A is a block diagram illustrating an example system 400*a* for secure pairing of devices. System 400*a* includes a provisioning device 100 (e.g., 100*a* or 100*b*) as previously described and illustrated with reference to FIGS. 1A and 1B, a pairable device 200 as previously described and illustrated with reference to FIG. 2, and a trusted source 300 as previously described and illustrated with reference to FIG. 3. Trusted source 300 may facilitate secure pairing of provisioning device 100 with pairable device 200 as previously described. Provisioning device 100 is communicatively coupled to trusted source 300 through a wireless communication link 402 and communicatively coupled to pairable device 200 through a wireless communication link 404. In this example, trusted source 300 may be a cloud based application and wireless communication link 402 may include a Wi-Fi communication link. Wireless communication link 404 may include a BT communication link, a BLE communication link, a Wi-Fi communication link, or an UWB communication link.

FIG. 4B is a block diagram illustrating another example system 400*b* for secure pairing of devices. System 400*b* includes a provisioning device 100, a pairable device 200, and a paired device 410 including a trusted source 300. Trusted source 300 may facilitate secure pairing of provisioning device 100 with pairable device 200 as previously described. Provisioning device 100 is communicatively coupled to paired device 410 (and thus to trusted source 300) through a wireless communication link 412. In this example, trusted source 300 may include an application installed on device 410 that is paired with provisioning device 100, and wireless communication link 412 may include a BT communication link, a BLE communication link, a Wi-Fi communication link, or an UWB communication link.

FIG. 4C is a block diagram illustrating another example system 400*c* for secure pairing of devices. System 400*c* includes a provisioning device 100, including a trusted source 300, and a pairable device 200. Trusted source 300 may facilitate secure pairing of provisioning device 100 with pairable device 200 as previously described. In this example, trusted source 300 may include an application installed on provisioning device 100. Since trusted source 300 is installed on provisioning device 100, in this example, provisioning device 100 may be referred to as a trusted device.

FIG. 4D is a block diagram illustrating another example system 400*d* for secure pairing of devices. System 400*d* includes a provisioning device 100, including a trusted source 300, and a plurality of pairable devices 2001 to 200N, where N is any suitable number of pairable devices. Trusted source 300 may facilitate secure pairing of provisioning device 100 with each pairable device 2001 to 200N either separately or simultaneously. Provisioning device 100 is communicatively coupled to each pairable device 2001 to 200N through a wireless communication link 4041 to 404N, respectively. Each wireless communication link 4041 to 404N may include a BT communication link, a BLE communication link, a Wi-Fi communication link, or an UWB communication link. While in the example illustrated in FIG. 4D, trusted source 300 is installed on or part of provisioning device 100, in other examples, trusted source 300 may include a cloud based application as illustrated in FIG. 4A or an application installed on a device that is paired with the provisioning device as illustrated in FIG. 4B.

Figure 5:
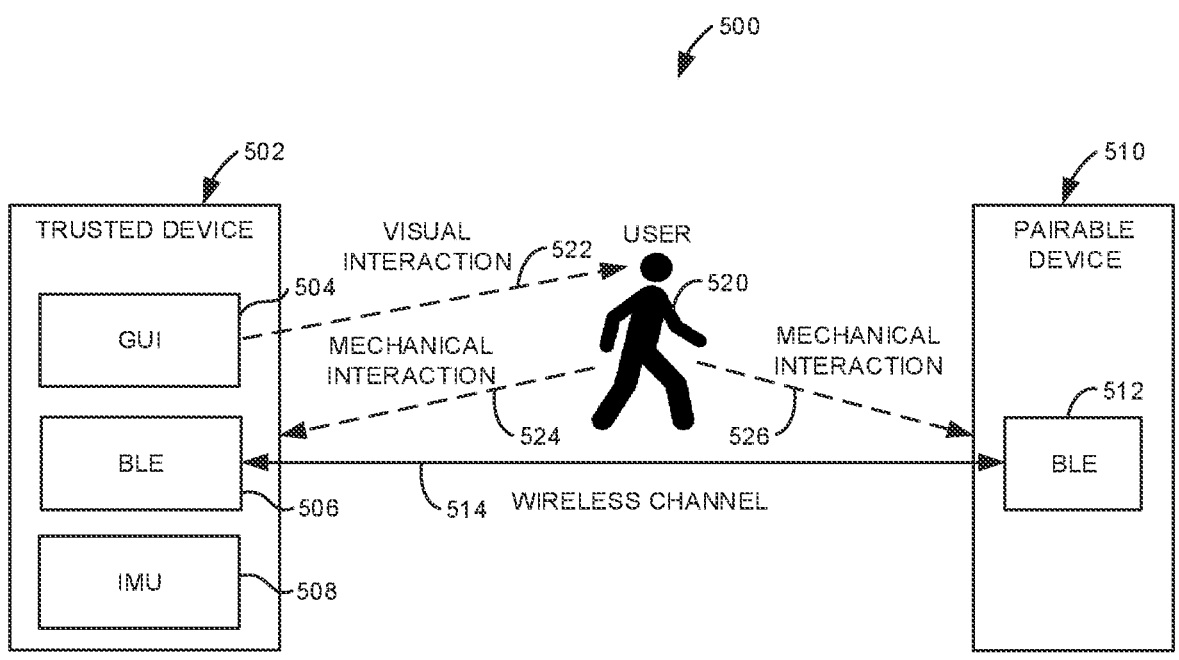
FIG. 5 is a diagram illustrating an example system for pairing a trusted device with a pairable device.

FIG. 5 is a diagram illustrating an example system 500 for pairing a trusted device 502 with a pairable device 510. Trusted device 502 includes a Graphical User Interface (GUI) 504, a BLE transceiver 506, and an IMU 508. Pairable device 510 includes a BLE transceiver 512. User 520 may visually interact with GUI 504 of trusted device 502 as indicated at 522 to pair trusted device 502 with pairable device 510. In one example, user 520 may mechanically interact with trusted device 502 as indicated at 524 to perform a gesture with the trusted device to pair trusted device 502 with pairable device 510. In another example, user 520 may mechanically interact with pairable device 510 as indicated at 526 to perform a gesture with the pairable device to pair trusted device 502 with pairable device 510. IMU 508 may verify the gesture performed by user 520 to pair trusted device 502 with pairable device 510. With trusted device 502 paired with pairable device 510, a secure BLE wireless channel is established between trusted device 502 and pairable device 510 as indicated at 514.

Figures 6A, 6B:
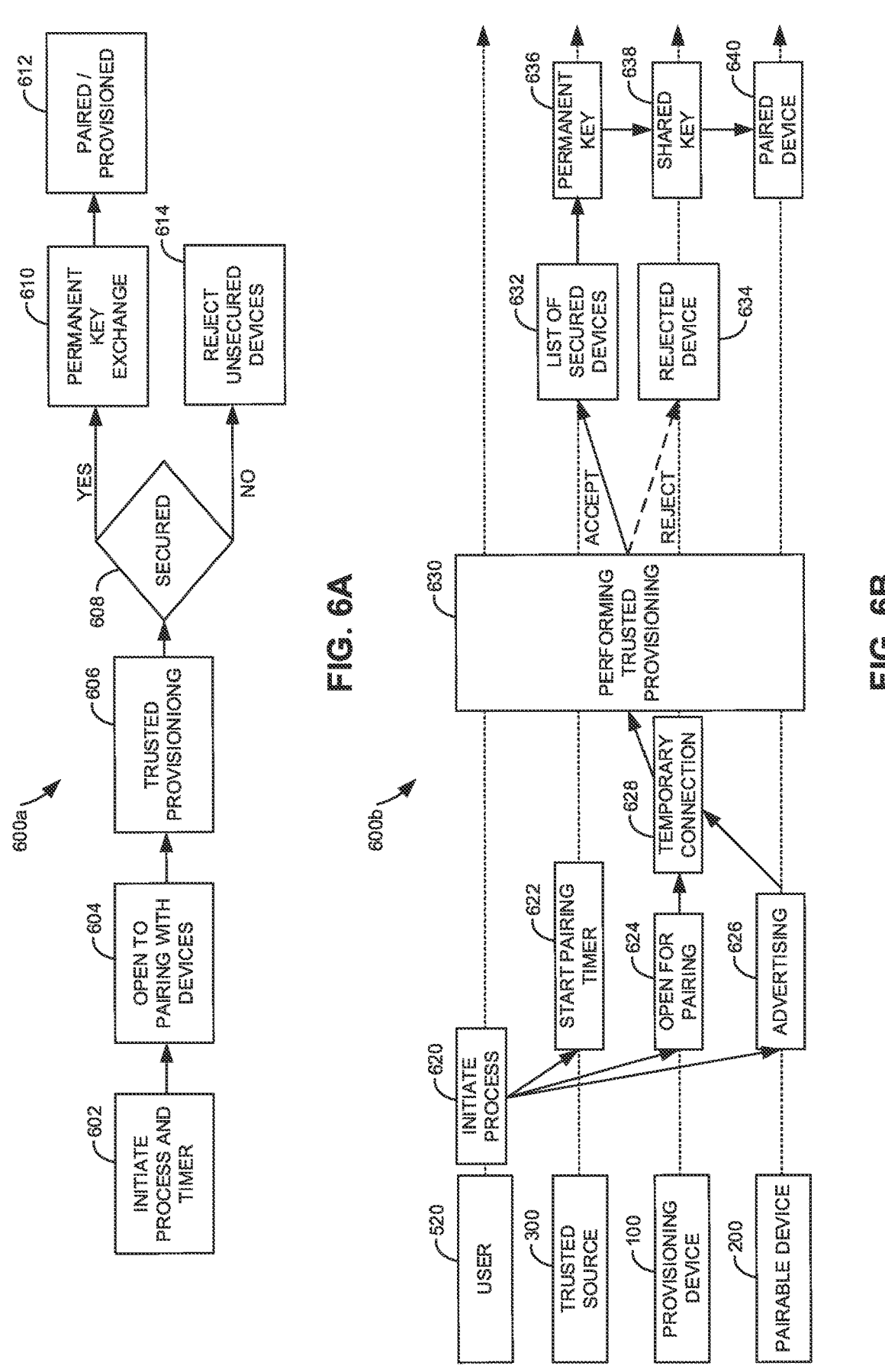
FIGS. 6A and 6B are process diagrams illustrating example pairing/provisioning procedures.

FIG. 6A is a process diagram illustrating an example pairing/provisioning procedure 600a. Procedure 600a is applicable to pairing a provisioning device with either a single pairable device or multiple pairable devices simultaneously. At 602, procedure 600a includes initiating the process (pairing/provisioning) and a timer. The process may be initiated by pressing a button on the pairable device, applying power to the pairable device, and/or via a user interface. The timer is set to elapse after a predetermined period to limit the amount of time in which the pairing process may be completed. If the timer elapses prior to completing the pairing process, the pairing process is cancelled and may be reinitiated at 602. At 604, procedure 600a includes opening (e.g., enabling) pairing with devices (e.g., a provisioning device and a pairable device). At 606, procedure 600a includes trusted provisioning (e.g., gesture instruction, performance, and comparison to expected gesture), which will be described below with reference to FIGS. 7A and 7B. At 608, procedure 600a determines whether the trusted provisioning was completed successfully and thus the pairing/provisioning is secured. If the pairing/provisioning between the devices is secured, then at 610 procedure 600a includes a permanent key exchange and at 612 the devices are paired/provisioned. If the pairing/provisioning between the devices is not secured, then at 614 procedure 600a rejects the unsecured devices.

FIG. 6B is a process diagram illustrating an example pairing/provisioning procedure 600b. Procedure 600b is implemented by a user 520, a trusted source 300, a provisioning device 100, and a pairable device 200 (or multiple pairable devices simultaneously). At 620, user 520 initiates the process (pairing/provisioning). In response to user 520 initiating the process at 620, at 622 the trusted source 300 starts a pairing timer, at 624 the provisioning device is opened for pairing, and at 626 the pairable device advertises its presence. If the pairing timer elapses prior to completing the pairing process, the pairing process is cancelled and may be reinitiated at 620. At 628, provisioning device 100 establishes a temporary (e.g., preliminary) connection to pairable device 200. At 630, the user 520, trusted source 300, provisioning device 100, and pairable device 200 perform the trusted provisioning, which will be described below with reference to FIGS. 7A and 7B. In response to the trusted provisioning completing successfully and pairable device 200 being accepted, at 632 trusted source 300 adds pairable device 200 to a list of secured devices and exchanges a permanent key at 636 with provisioning device 100. At 638, provisioning device 100 exchanges a shared key with pairable device 200, and at 640 pairable device 200 is paired with provisioning device 100. In response to the trusted provisioning not completing successfully and pairable device 200 being rejected, at 634 provisioning device 100 rejects pairable device 200.

Figures 7A, 7B:
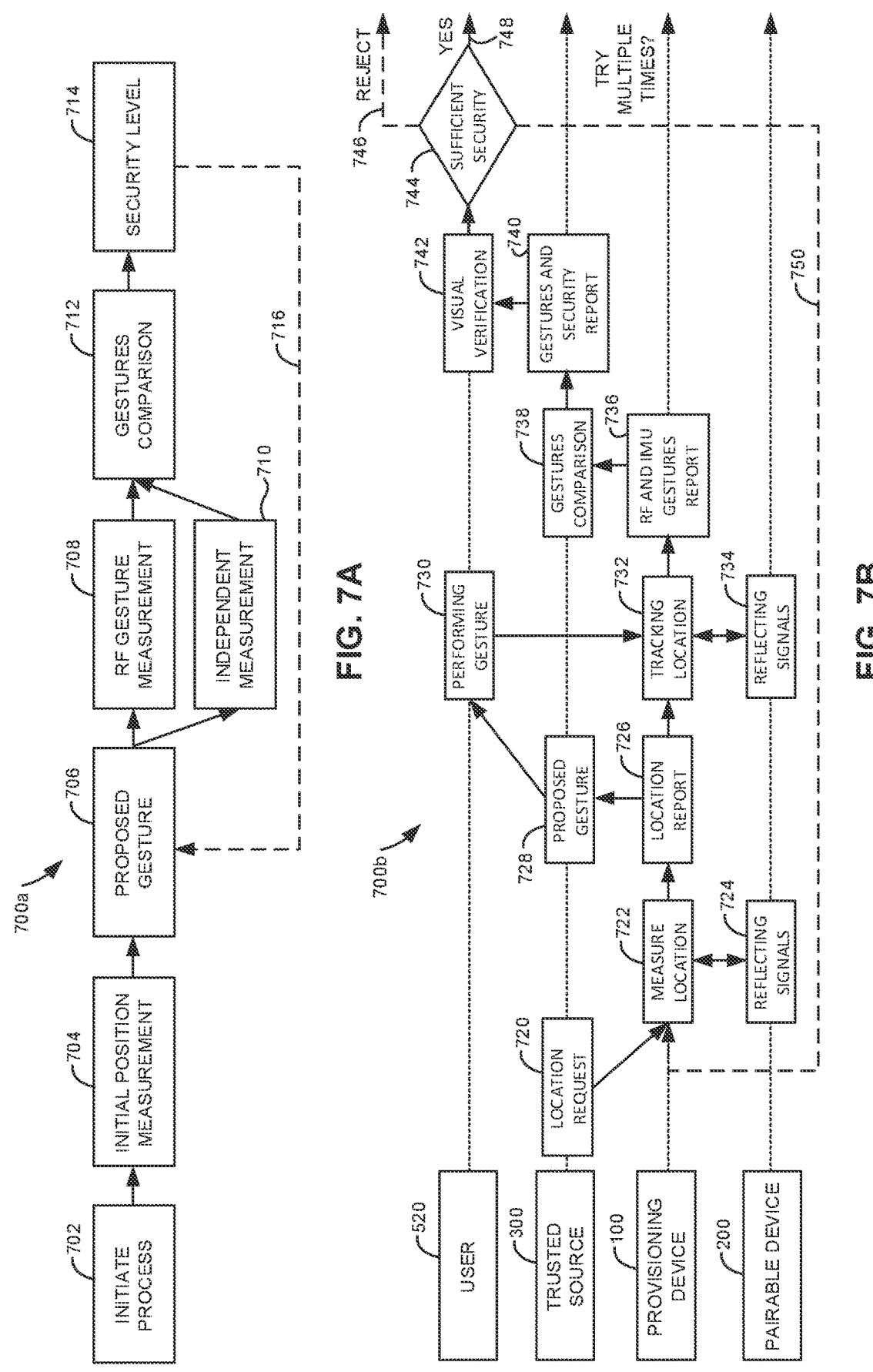
FIGS. 7A and 7B are process diagrams illustrating example trusted pairing/provisioning using gestures.

FIG. 7A is a process diagram illustrating an example trusted pairing/provisioning procedure 700a using gestures. Procedure 700a is applicable to pairing a provisioning device with either a single pairable device or multiple pairable devices simultaneously. At 702, procedure 700a includes initiating the process (pairing/provisioning). At 704, procedure 700a includes an initial position measurement (e.g., of the provisioning device relative to the pairable device). At 706, procedure 700a includes providing a proposed gesture (e.g., via a user interface). At 708, procedure 700a includes a Radio Frequency (RF) gesture measurement (e.g., via a localization system). At 710, procedure 700a includes an independent measurement of the gesture in parallel with the RF gesture measurement (e.g., via a motion sensor). At 712, procedure 700a includes a gesture comparison (e.g., of the RF gesture measurement and/or the independent measurement to the proposed [expected] gesture). At 714, procedure 700a includes determining a security level based on the gesture comparison. If the determined security level is sufficient, the provisioning device is successfully paired with the pairable device(s). If the determined security level is insufficient, as indicated at 716, procedure 700a may be repeated starting at 706 where a proposed gesture is again provided.

FIG. 7B is a process diagram illustrating an example trusted pairing/provisioning procedure 700b using gestures. Procedure 700b is implemented by a user 520, a trusted source 300, a provisioning device 100, and a pairable device 200 (or multiple pairable devices simultaneously). At 720, trusted source 300 sends a location request to provisioning device 100. At 722, provisioning device 100 measures the location of provisioning device 100 (e.g., via a localization system) relative to pairable device 200 by transmitting RF signals to pairable device 200, which are reflected by pairable device 200 at 724. At 726, provisioning device 100 provides a location report to trusted source 300. At 728, trusted source 300 provides (e.g., via a user interface) a proposed gesture to the user 520 based on the location report. At 730, user 520 performs the proposed gesture (e.g., with provisioning device 100).

At 732, provisioning device 100 tracks the location (e.g., via a localization system) of the provisioning device during the user performance of the gesture by transmitting RF signals to pairable device 200, which are reflected by pairable device 200 at 734. At 736, provisioning device 100 sends a RF (e.g., as sensed by a localization system) and IMU (e.g., as sensed by a motion sensor) gestures report to trusted source 300. At 738, trusted source 300 performs a gestures comparison (e.g., by comparing the RF and/or IMU sensed performed gestures to the proposed [expected] gesture and/or to each other). At 740, trusted source 300 provides a gestures and security report to user 520 based on the gestures comparison. At 742, user 520 may visually verify (e.g., via a user interface) that the sensed gestures match the expected gesture. At 744, user 520 determines whether the security is sufficient. If the security is sufficient as indicated at 748, provisioning device 100 is paired with pairable device 200. If the security is not sufficient, the pairing between provisioning device 100 and pairable device 200 is rejected at indicated at 746 or the pairing may be retried one or multiple times as indicated at 750.

Figure 8A:
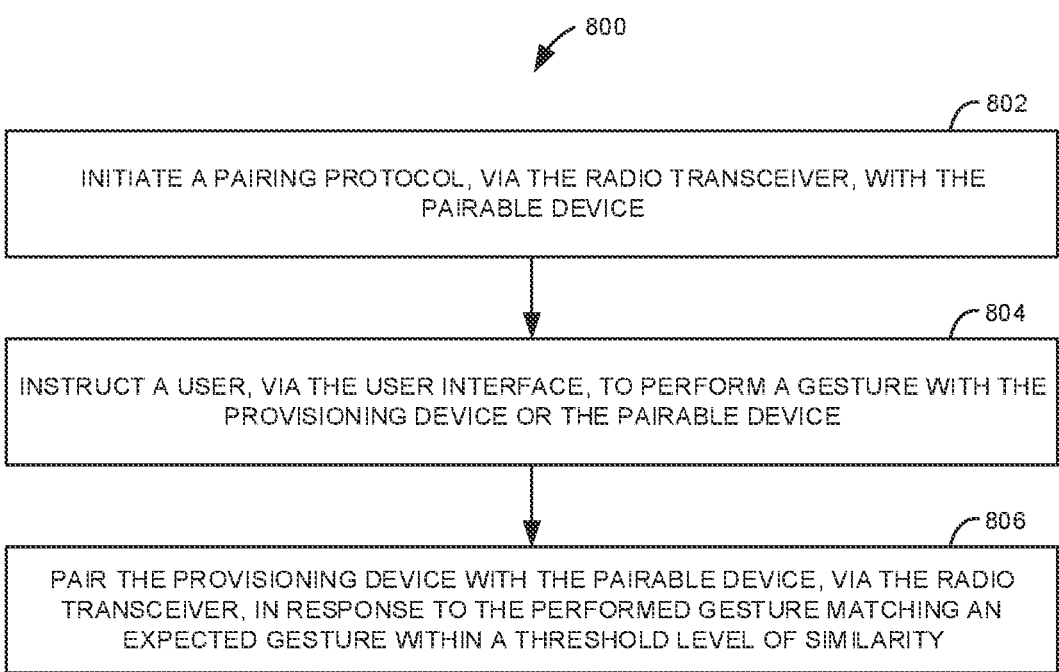
FIGS. 8A-8E are flow diagrams illustrating one example of a method for pairing a provisioning device with a pairable device.

FIGS. 8A-8E are flow diagrams illustrating one example of a method 800 for pairing a provisioning device (e.g., 100a of FIG. 1A or 100b of FIG. 1B) with a pairable device (e.g., 200 of FIG. 2). Method 800 may be implemented by a provisioning device (e.g., 100a of FIG. 1A or 100b of FIG. 1B) including a user interface (e.g., 102), a radio transceiver (e.g., 104) to communicate with the pairable device, and a controller (e.g., 106). In some examples, the radio transceiver includes a BT transceiver, a BLE transceiver, a Wi-Fi transceiver, or an UWB transceiver. As illustrated in FIG. 8A at 802, the controller may initiate a pairing protocol, via the radio transceiver, with the pairable device. At 804, the controller may instruct a user (e.g., 520 of FIG. 5), via the user interface, to perform a gesture with the provisioning device or the pairable device. At 806, the controller may pair the provisioning device with the pairable device, via the radio transceiver, in response to the performed gesture matching an expected gesture within a threshold level of similarity. In one example, a complexity of the gesture corresponds to a security level associated with the pairing between the provisioning device and the pairable device.

Figure 8B:
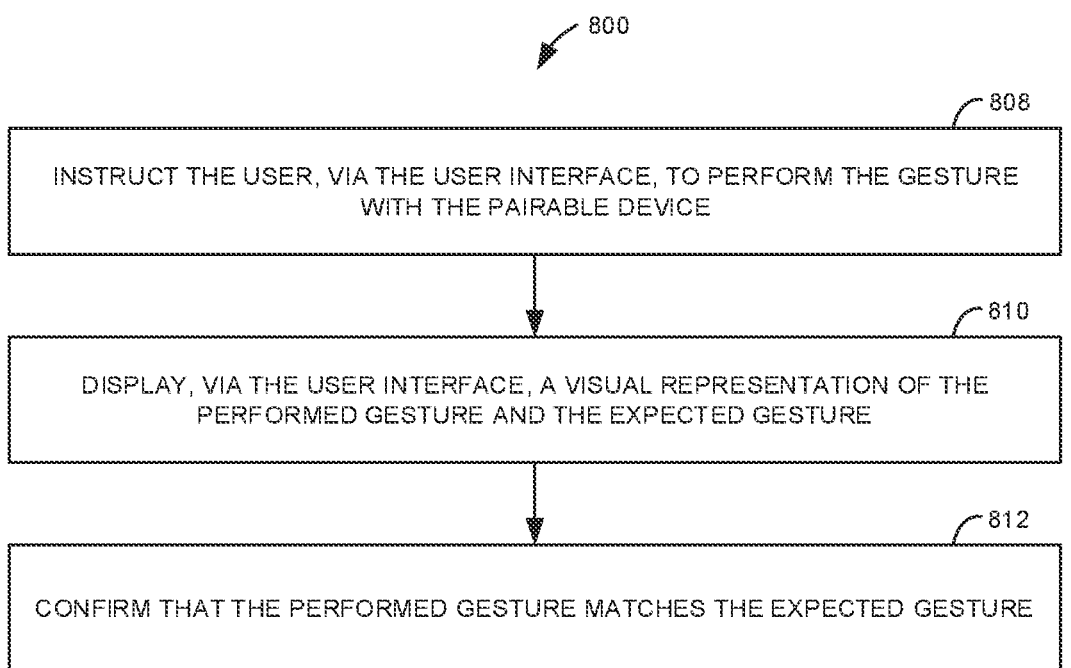

As illustrated in FIG. 8B at 808, the controller may further instruct the user, via the user interface, to perform the gesture with the pairable device. At 810, the controller may further display, via the user interface, a visual representation of the performed gesture and the expected gesture. At 812, the controller may further confirm, by the user through the user interface, that the performed gesture matches the expected gesture.

Figure 8C:
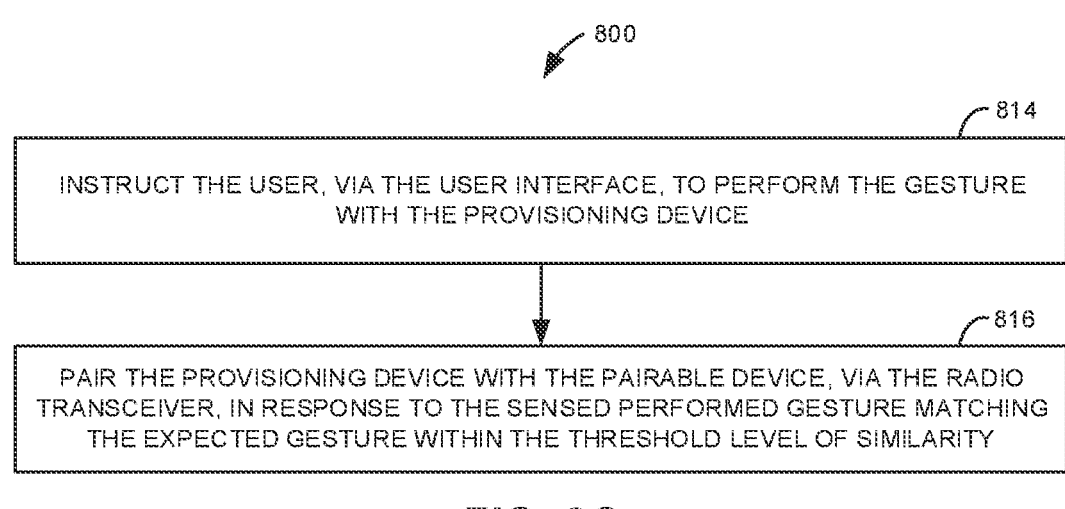

In some examples, the provisioning device may further include a localization system (e.g., including 108 of FIG. 1B) to sense the performed gesture. In some examples, the localization system senses distance change, velocity, angle, and/or angular velocity. The localization system may include an Inertial Measurement Unit (IMU), an infrared Time of Flight (ToF) sensor, or a camera. In this example, as illustrated in FIG. 8C at 814, the controller may further instruct the user, via the user interface, to perform the gesture with the provisioning device. At 816, the controller may further pair the provisioning device with the pairable device, via the radio transceiver, in response to the sensed performed gesture matching the expected gesture within the threshold level of similarity.

Figure 8D:
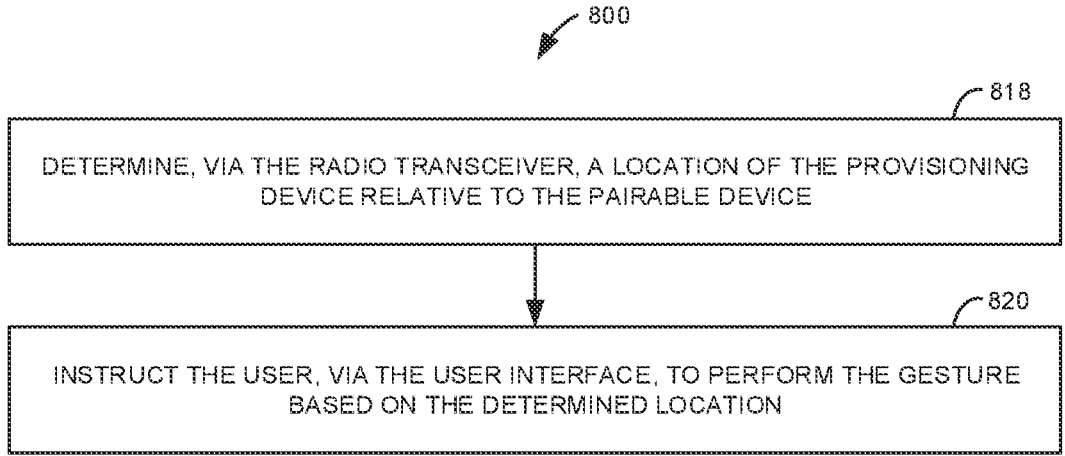

As illustrated in FIG. 8D at 818, the controller may further determine, via the radio transceiver, a location of the provisioning device relative to the pairable device. At 820, the controller may further instruct the user, via the user interface, to perform the gesture based on the determined location. In some examples, the location is determined based on a distance measurement, a velocity measurement, an angle of arrival (AoA), and/or a Time of Flight (ToF).

Figure 8E:
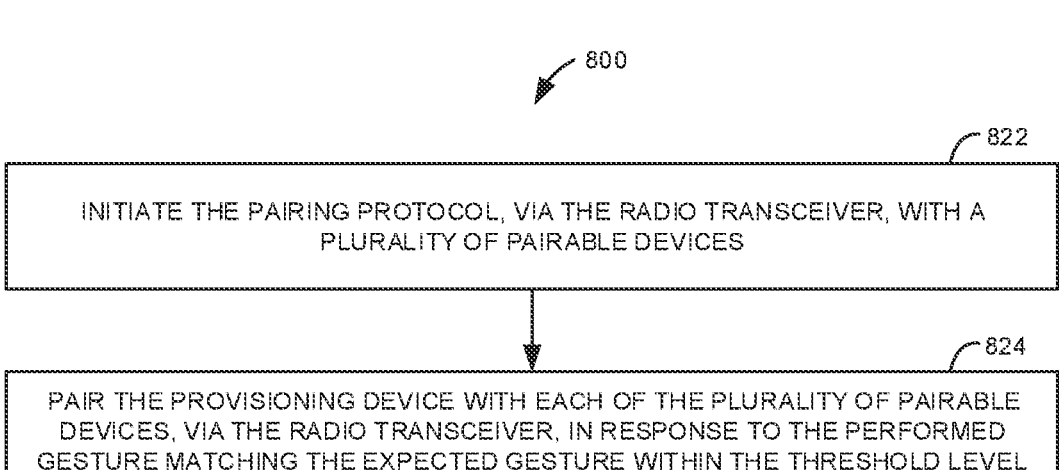

As illustrated in FIG. 8E at 822, the controller may further initiate the pairing protocol, via the radio transceiver, with a plurality of pairable devices (e.g., 2001 to 200N of FIG. 4D).

At 824, the controller may further pair the provisioning device with each of the plurality of pairable devices, via the radio transceiver, in response to the performed gesture matching the expected gesture within the threshold level of similarity.

Figure 9A:
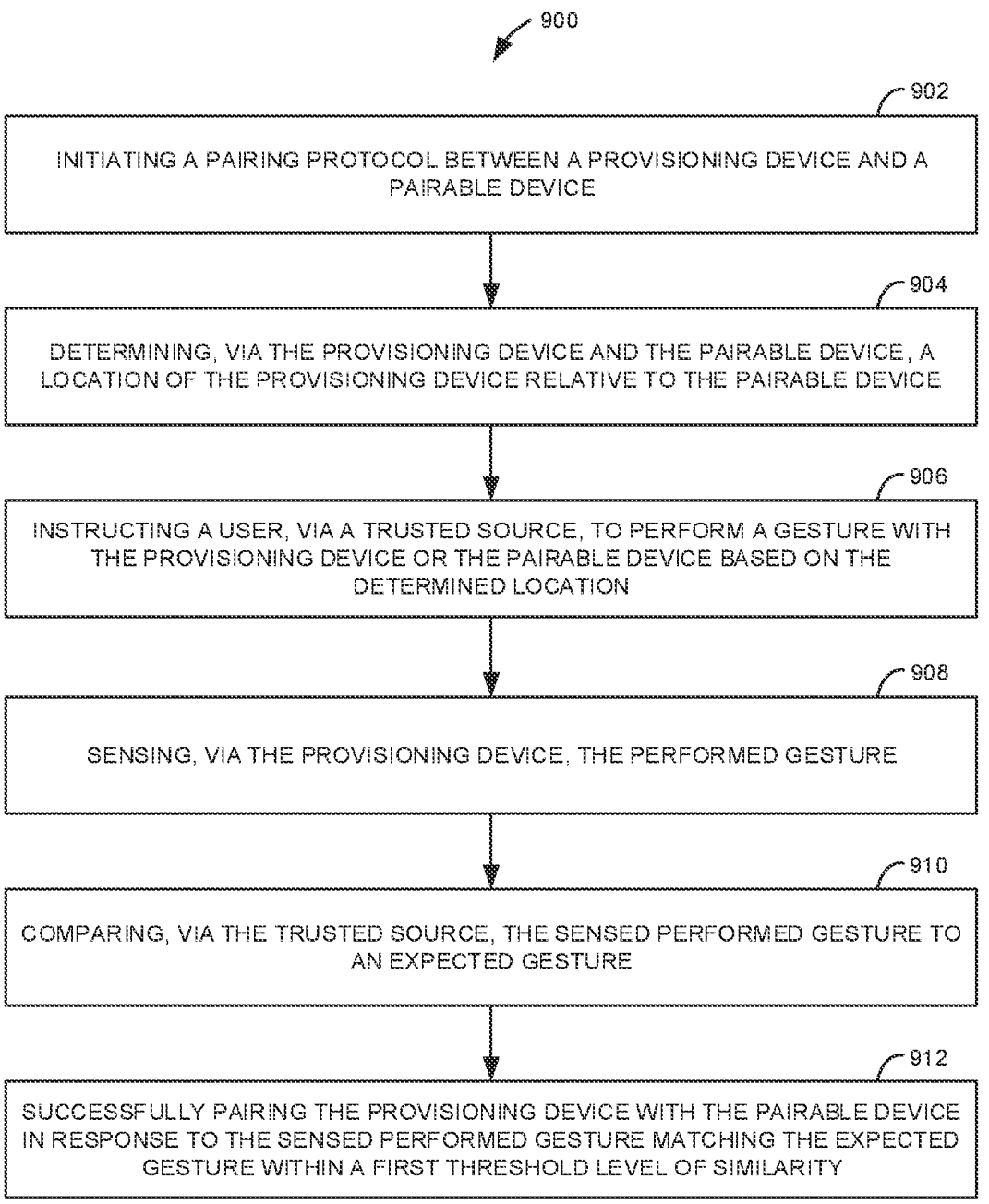

FIGS. 9A-9E are flow diagrams illustrating an example of a method 900 for secure pairing of devices. As illustrated in FIG. 9A at 902, method 900 includes initiating a pairing protocol between a provisioning device (e.g., 100a of FIG. 1A or 100b of FIG. 1B) and a pairable device (e.g., 200 of FIG. 2). At 904, method 900 includes determining, via the provisioning device and the pairable device, a location of the provisioning device relative to the pairable device. At 906, method 900 includes instructing a user (e.g., 520 of FIG. 5), via a trusted source (e.g., 300 of FIG. 3), to perform a gesture with the provisioning device or the pairable device based on the determined location. At 908, method 900 includes sensing, via the provisioning device, the performed gesture. At 910, method 900 includes comparing, via the trusted source, the sensed performed gesture to an expected gesture. At 912, method 900 includes successfully pairing the provisioning device with the pairable device in response to the sensed performed gesture matching the expected gesture within a first threshold level of similarity.

Figure 9B:
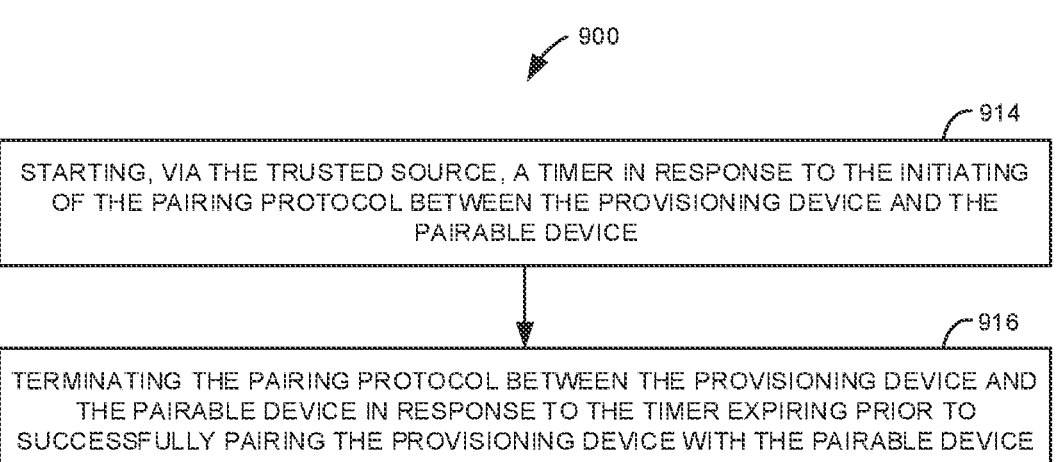

As illustrated in FIG. 9B at 914, method 900 may further include starting, via the trusted source, a timer in response to the initiating of the pairing protocol between the provisioning device and the pairable device. At 916, method 900 may further include terminating the pairing protocol between the provisioning device and the pairable device in response to the timer expiring prior to successfully pairing the provisioning device with the pairable device.

Figure 9C:
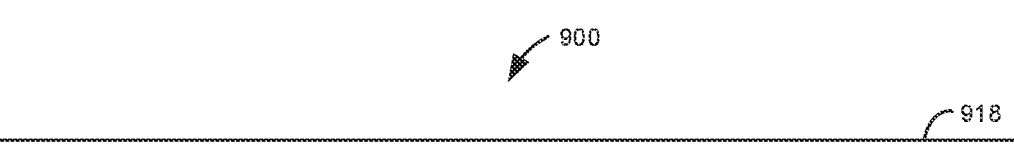

As illustrated in FIG. 9C at 918, method 900 may further include rejecting the pairing or reinitiating the pairing protocol between the provisioning device and the pairable device in response to the sensed performed gesture not matching the expected gesture within the first threshold level of similarity.

As illustrated in FIG. 9D at 920, method 900 may further include sensing, via a localization system (e.g., including 108 of FIG. 1B and/or 204 of FIG. 2), the performed gesture. At 922, method 900 may further include instructing the user to perform the gesture with the provisioning device. At 924, method 900 may further include successfully pairing the provisioning device with the pairable device in response to the sensed performed gesture from the localization system matching the expected gesture within the first threshold level of similarity.

As illustrated in FIG. 9E at 926, method 900 may further include receiving, via the trusted source, an indication that the gesture cannot be performed as instructed. At 928, method 900 may further include sensing, via a motion sensor (e.g., 110 of FIG. 1B) and the localization system, a partially performed gesture. At 930, method 900 may further include in response to the indication, successfully pairing the provisioning device with the pairable device in response to the sensed partially performed gesture from the localization system matching the sensed partially performed gesture from the motion sensor within the first threshold level of similarity and the sensed partially performed gesture from the localization system or the motion sensor matching the expected gesture within a second threshold level of similarity lower than the first threshold level of similarity.

Figure 10A:
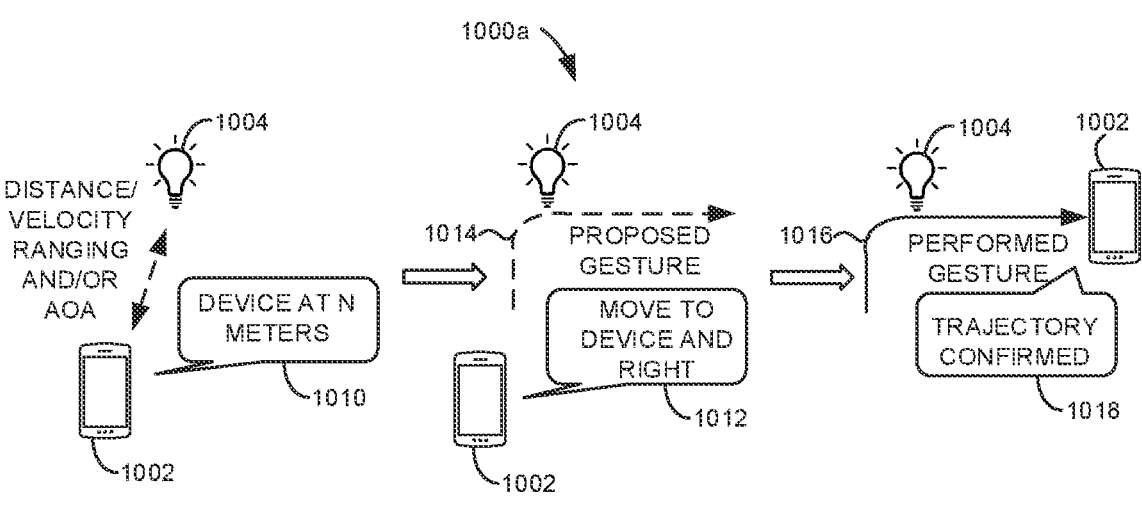
FIGS. 10A and 10B are diagrams illustrating example processes of pairing a provisioning device with a single pairable device and multiple pairable devices, respectively.

FIG. 10A is a diagram illustrating an example process 1000a for pairing a provisioning device 1002 with a single pairable device 1004. In this example, provisioning device 1002 may be a smartphone including a trusted source (e.g., a trusted device), and pairable device 1004 may be a smart light bulb. It is noted that pairable device 1004 does not include a display. A pairing protocol between provisioning device 1002 and pairable device 1004 may be initiated by pressing a button on pairable device 1004 or initially applying power to pairable device 1004. With the pairing protocol initiated, using a localization system of provisioning device 1002 and pairable device 1004, provisioning device 1002 may determine its location relative to pairable device 1004 via distance measurements, velocity ranging, and/or angle of arrival. As indicated at 1010 (e.g., "DEVICE AT N METERS"), provisioning device 1002 may report, via a user interface, the provisioning device position relative to pairable device 1004. As indicated at 1012 (e.g., "MOVE TO DEVICE AND RIGHT"), provisioning device 1002 may instruct the user, via the user interface, to perform a proposed gesture as indicated at 1014 with the provisioning device 1002. As indicated at 1016, the user performs the proposed gesture and provisioning device 1002 determines whether the performed gesture 1016 matches the proposed gesture 1014. In response to the performed gesture 1016 matching the proposed gesture 1014, the pairing is successful and as indicated at 1018 (e.g., "TRAJECTORY CONFIRMED"), provisioning device 1002 may inform the user, via the user interface, that the performed gesture matches the proposed gesture.

Figure 10B:
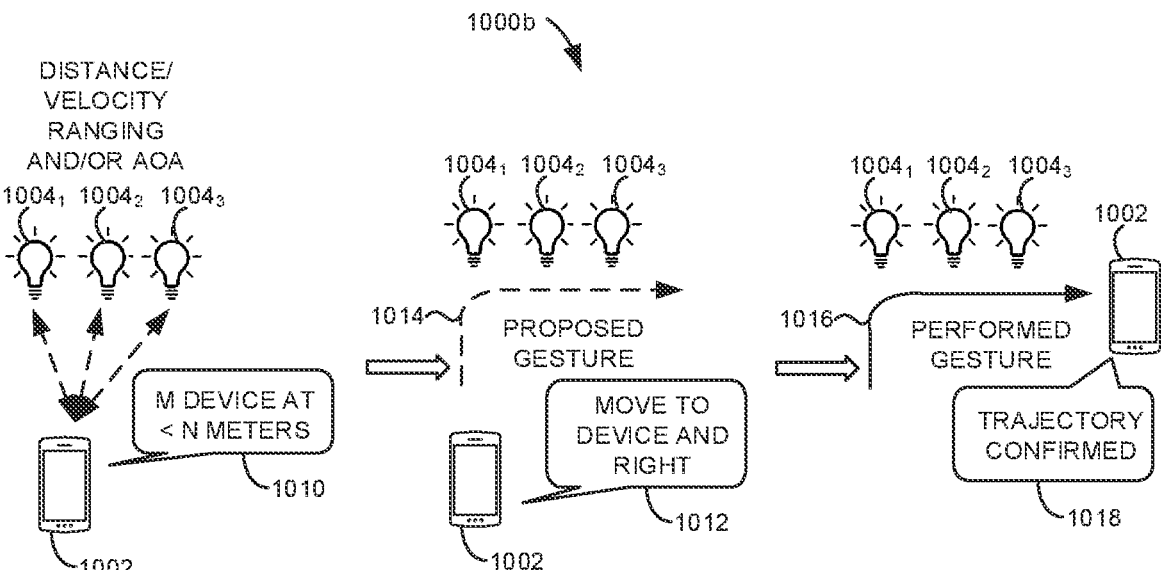

FIG. 10B is a diagram illustrating an example process 1000b of pairing a provisioning device 1002 with multiple pairable devices 10041 to 10043. In this example, provisioning device 1002 may be a smartphone including a trusted source (e.g., a trusted device), and pairable devices 10041 to 10043 may be smart light bulbs. It is noted that pairable devices 10041 to 10043 do not include a display. A pairing protocol between provisioning device 1002 and pairable devices 10041 to 10043 may be initiated by pressing a button on each pairable device 10041 to 10043 or initially applying power to each pairable device 10041 to 10043. With the pairing protocol initiated, using a localization system of provisioning device 1002 and pairable devices 10041 to 10043, provisioning device 1002 may determine its location relative to each pairable device 10041 to 10043 via distance measurements, velocity ranging, and/or angle of arrival. As indicated at 1010 (e.g., "DEVICE AT<N METERS"), provisioning device 1002 may report, via a user interface, the provisioning device position relative to pairable devices 10041 to 10043. As indicated at 1012 (e.g., "MOVE TO DEVICE AND RIGHT"), provisioning device 1002 may instruct the user, via the user interface, to perform a proposed gesture as indicated at 1014 with the provisioning device 1002. As indicated at 1016, the user performs the proposed gesture and provisioning device 1002 determines whether the performed gesture 1016 matches the proposed gesture 1014. In response to the performed gesture 1016 matching the proposed gesture 1014, the pairing is successful and as indicated at 1018 (e.g., "TRAJECTORY CONFIRMED"), provisioning device 1002 may inform the user, via the user interface, that the performed gesture matches the proposed gesture.

Figure 11A:
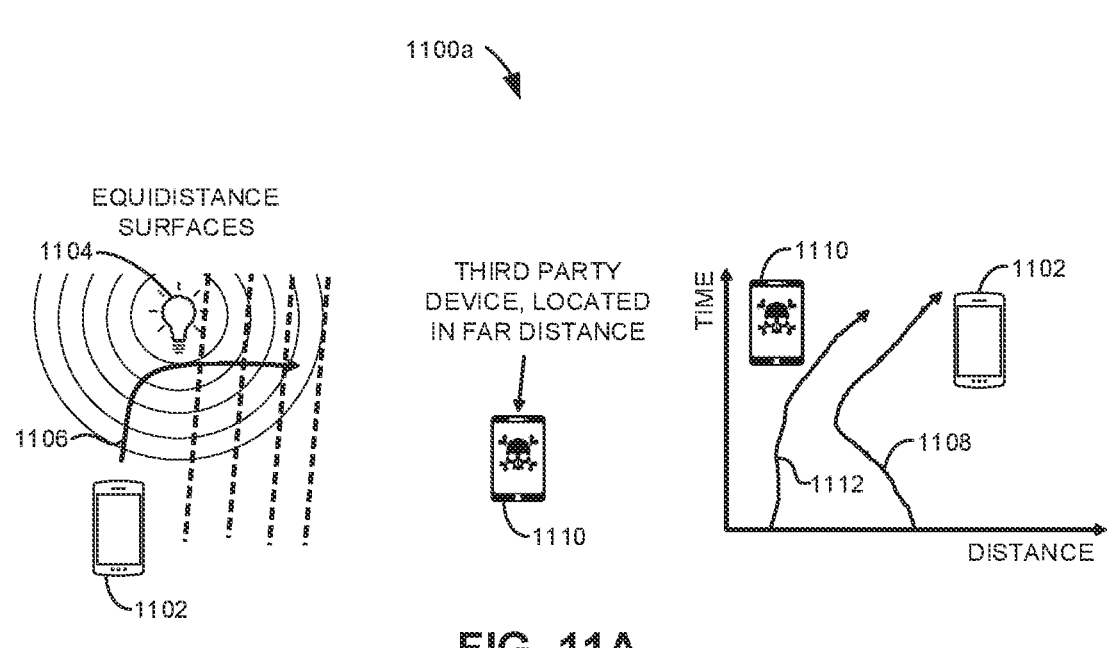
FIGS. 11A and 11B are diagrams illustrating examples of pairing provisioning devices with pairable devices while rejecting third party devices.

FIG. 11A is a diagram illustrating an example 1100a of pairing a provisioning device 1102 with a pairable device 1104 while rejecting a third party device 1110. In this example, provisioning device 1102 may be a smartphone including a trusted source (e.g., a trusted device), and pairable device 1104 may be a smart light bulb. Third party device 1110 may also be a smartphone. Provisioning device 1102 is closer to pairable device 1104 than third party device 1110. Thus, due to equidistance surfaces of pairable device

1104, a gesture as indicated at 1106 performed with provisioning device 1102 will look different than a similar gesture performed with third party device 1110. As shown in the chart on the right, the gesture measured by a localization system and/or motion sensor of provisioning device 1102 is more similar to the expected gesture 1106 as indicated at 1108 than a gesture measured by a localization system and/or motion sensor of third party device 1110 as indicated at 1112. The measured trajectory may be used as a key that is known by only the trusted source to successfully pair provisioning device 1102 with pairable device 1104 while rejecting third party device 1110.

Figure 11B:
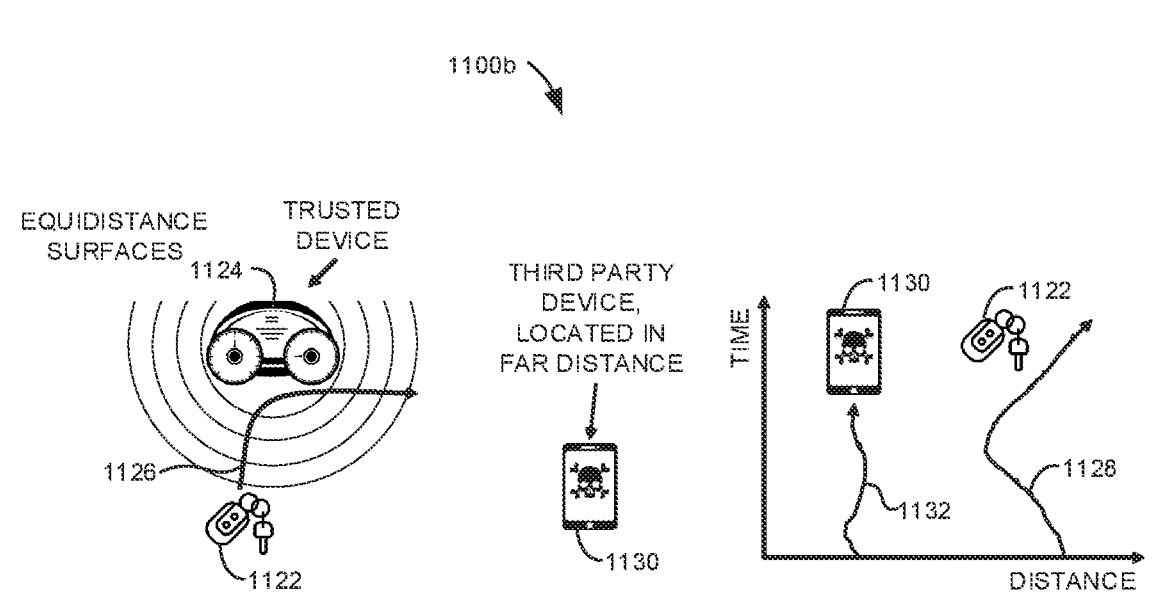

FIG. 11B is a diagram illustrating an example 1100b of pairing a trusted device 1124 with a pairable device 1122 while rejecting a third party device 1130. In this example, trusted device 1124 may be a vehicle including a provisioning device and a trusted source, and pairable device 1122 may be a key fob. Third party device 1130 may be a smartphone or another key fob. Pairable device 1122 is closer to trusted device 1124 than third party device 1130. Thus, due to equidistance surfaces of trusted device 1124, a gesture as indicated at 1126 performed with pairable device 1122 will look different than a similar gesture performed with third party device 1130. As shown in the chart on the right, the gesture measured by a localization system and/or motion sensor of trusted device 1124 performed with pairable device 1122 is more similar to the expected gesture 1126 as indicated at 1128 than a gesture measured by a localization system and/or motion sensor of trusted device 1124 performed with third party device 1130 as indicated at 1132. The measured trajectory may be visually confirmed by the user by displaying the expected trajectory and the measured trajectory on trusted device 1124 to successfully pair trusted device 1124 with pairable device 1122 while rejecting third party device 1130.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A provisioning device comprising:
   a user interface;
   a radio transceiver to communicate with a pairable device; and
   a controller configured to:
      initiate a pairing protocol, via the radio transceiver, with the pairable device;
      instruct a user, via the user interface, to perform a gesture with the provisioning device or the pairable device;
      pair the provisioning device with the pairable device, via the radio transceiver, in response to the performed gesture matching an expected gesture within a first threshold level of similarity; and
      pair the provisioning device with the pairable device, via the radio transceiver, in response to the performed gesture matching the expected gesture within a second threshold level of similarity less than the first threshold level of similarity in response to the user indicating the gesture cannot be performed as instructed.

2. The provisioning device of claim 1, wherein the controller is configured to:

display, via the user interface, a visual representation of the performed gesture and the expected gesture; and confirm that the performed gesture matches the expected gesture.

3. The provisioning device of claim 1, further comprising:

a localization system to sense the performed gesture, wherein the controller is configured to:

pair the provisioning device with the pairable device, via the radio transceiver, in response to the sensed performed gesture matching the expected gesture within the first threshold level of similarity.

4. The provisioning device of claim 3, wherein the localization system senses distance change, velocity, angle, and/or angular velocity.

5. The provisioning device of claim 3, wherein the localization system comprises an Inertial Measurement Unit (IMU), an infrared Time of Flight (ToF) sensor, or a camera.

6. The provisioning device of claim 1, wherein the controller is configured to:

determine, via the radio transceiver, a location of the provisioning device relative to the pairable device; and instruct the user, via the user interface, to perform the gesture based on the determined location.

7. The provisioning device of claim 6, wherein the location is determined based on a distance measurement, a velocity measurement, an angle of arrival (AoA), and/or a Time of Flight (ToF).

8. The provisioning device of claim 1, wherein the radio transceiver comprises a Bluetooth (BT) transceiver, a Bluetooth Low Energy (BLE) transceiver, a Wi-Fi transceiver, or an Ultra-wideband (UWB) transceiver.

9. The provisioning device of claim 1, wherein the controller is configured to:

initiate the pairing protocol, via the radio transceiver, with a plurality of pairable devices simultaneously; and pair the provisioning device with each of the plurality of pairable devices, via the radio transceiver, in response to the performed gesture matching the expected gesture within the first threshold level of similarity.

10. The provisioning device of claim 1, wherein a complexity of the gesture corresponds to a security level associated with the pairing between the provisioning device and the pairable device.

11. A system comprising:

a provisioning device to pair with a pairable device over a wireless communication channel for secure communications;

a trusted source to determine a gesture to be performed with the provisioning device or the pairable device and to compare a sensed performed gesture to an expected gesture to pair the provisioning device with the pairable device;

a user interface to instruct a user of the gesture to be performed;

a localization system to sense the performed gesture; and a motion sensor to sense the performed gesture, wherein the provisioning device is to pair with the pairable device in response to the sensed performed gesture from the localization system matching the expected gesture within a first threshold level of similarity, wherein the provisioning device is to pair with the pairable device in response to the sensed performed gesture from the localization system matching the sensed performed gesture from the motion sensor within the first threshold level of similarity, and wherein the provisioning device is to pair with the pairable device in response to the sensed performed gesture from the localization system or the motion sensor matching the expected gesture within a second threshold level of similarity lower than the first threshold level of similarity in response to the user indicating the gesture cannot be performed as instructed.

12. The system of claim 11, wherein the trusted source comprises an application installed on the provisioning device, a cloud based application, or an application installed on a device that is paired with the provisioning device.

13. The system of claim 11, wherein the localization system is part of the provisioning device and the pairable device, and wherein the user interface is part of the provisioning device or the trusted source.

14. The system of claim 11, wherein a complexity of the gesture corresponds to a security level associated with the pairing between the provisioning device and the pairable device.

15. A method for secure pairing of devices, the method comprising:

initiating a pairing protocol between a provisioning device and a pairable device;

determining, via the provisioning device and the pairable device, a location of the provisioning device relative to the pairable device;

instructing a user, via a trusted source, to perform a gesture with the provisioning device or the pairable device based on the determined location;

sensing, via the provisioning device, the performed gesture;

comparing, via the trusted source, the sensed performed gesture to an expected gesture; and successfully pairing the provisioning device with the pairable device in response to the sensed performed gesture matching the expected gesture within a first threshold level of similarity, wherein the sensing, via the provisioning device, the performed gesture comprises sensing, via a localization system the performed gesture, wherein the instructing of the user, via the trusted source comprises instructing the user to perform the gesture with the provisioning device, wherein successfully pairing the provisioning device with the pairable device is in response to the sensed performed gesture from the localization system matching the expected gesture within the first threshold level of similarity, and wherein the method further comprises:

receiving, via the trusted source, an indication that the gesture cannot be performed as instructed;

sensing, via a motion sensor and the localization system, a partially performed gesture; and in response to the indication, successfully pairing the provisioning device with the pairable device in response to the sensed partially performed gesture from the localization system matching the sensed partially performed gesture from the motion sensor within the first threshold level of similarity and the sensed partially performed gesture from the localization system or the motion sensor matching the expected gesture within a second threshold level of similarity lower than the first threshold level of similarity.

16. The method of claim 15, further comprising:

starting, via the trusted source, a timer in response to the initiating of the pairing protocol between the provisioning device and the pairable device; and terminating the pairing protocol between the provisioning device and the pairable device in response to the timer expiring prior to successfully pairing the provisioning device with the pairable device.

17. The method of claim 15, further comprising:

rejecting the pairing or reinitiating the pairing protocol between the provisioning device and the pairable device in response to the sensed performed gesture not matching the expected gesture within the first threshold level of similarity.

18. The method of claim 15, wherein a complexity of the gesture corresponds to a security level associated with the pairing between the provisioning device and the pairable device.

* * * * *